(12) United States Patent
Perez et al.

(10) Patent No.: US 12,290,767 B2
(45) Date of Patent: May 6, 2025

(54) APPARATUS AND METHOD FOR CONCENTRATING CORROSIVE LIQUIDS

(71) Applicant: Andreas Wilk, Lorrach (DE)

(72) Inventors: Fabien Perez, Cornier (FR); Andreas Wilk, Basel (CH)

(73) Assignee: Andreas Wilk, Lorrach (DE)

( * ) Notice: Subject to any disclaimer, the term of this patent is extended or adjusted under 35 U.S.C. 154(b) by 60 days.

(21) Appl. No.: 18/032,346

(22) PCT Filed: Nov. 4, 2021

(86) PCT No.: PCT/EP2021/080641
§ 371 (c)(1),
(2) Date: Apr. 18, 2023

(87) PCT Pub. No.: WO2022/117275
PCT Pub. Date: Jun. 9, 2022

(65) Prior Publication Data
US 2023/0390667 A1  Dec. 7, 2023

(30) Foreign Application Priority Data
Dec. 1, 2020  (DE) .................... 10 2020 131 827.8

(51) Int. Cl.
*B01D 3/00* (2006.01)
*B01D 1/00* (2006.01)
*C01B 17/88* (2006.01)

(52) U.S. Cl.
CPC ............. *B01D 3/007* (2013.01); *C01B 17/88* (2013.01); *B01D 1/00* (2013.01)

(58) Field of Classification Search
CPC ............................ C01B 17/88; C02F 1/04–20

USPC ...................... 159/20.1, 24.1, 24.2
See application file for complete search history.

(56) References Cited

U.S. PATENT DOCUMENTS

| | | | | |
|---|---|---|---|---|
| 1,440,026 | A | * | 12/1922 | Nilsson ................. B01D 1/2818 516/122 |
| 2,278,543 | A | * | 4/1942 | French ................... B01D 3/08 203/40 |
| 2,310,649 | A | * | 2/1943 | Peebles ................. B01D 1/12 159/31 |

(Continued)

FOREIGN PATENT DOCUMENTS

| CH | 641126 A5 | 2/1984 |
|---|---|---|
| CN | 107619078 A | 1/2018 |

(Continued)

OTHER PUBLICATIONS

Office Action issued in corresponding Japanese Patent Application No. 2023-523669 dated Jun. 26, 2024 (9 pages).

*Primary Examiner* — Jonathan Luke Pilcher
(74) *Attorney, Agent, or Firm* — Kilyk & Bowersox, P.L.L.C.

(57) ABSTRACT

The invention relates to an apparatus for the continuous concentration of corrosive liquids, the apparatus comprising a fluid system with a regenerative heat exchanger for preheating the dilute liquid and a vapour line to supply solvent vapour, which has been separated from the heated liquid in a main separator, to the hot side of the regenerative heat exchanger as a heat source. The invention further relates to a method for continuously concentrating corrosive liquids, wherein the system pressure is greater than 1 bar.

15 Claims, 1 Drawing Sheet

(56) References Cited

U.S. PATENT DOCUMENTS

| | | | | |
|---|---|---|---|---|
| 2,332,215 A * | 10/1943 | French | | B01D 1/16 209/11 |
| 3,218,241 A * | 11/1965 | Checkovich | | C02F 1/042 159/DIG. 13 |
| 3,245,883 A * | 4/1966 | Loebel | | B01D 1/2818 202/197 |
| 3,294,650 A * | 12/1966 | Manteufel | | C01B 17/88 159/17.3 |
| 3,332,470 A | 7/1967 | Chirico et al. | | |
| 3,471,373 A * | 10/1969 | Pottharst, Jr. | | B01D 1/2896 202/202 |
| 3,748,234 A * | 7/1973 | Pottharst, Jr. | | B01D 1/289 202/187 |
| 3,933,575 A * | 1/1976 | Guth | | B01D 1/00 159/DIG. 19 |
| 3,970,511 A * | 7/1976 | Rat | | B01D 1/22 159/13.4 |
| 4,002,538 A * | 1/1977 | Pottharst, Jr. | | B01D 1/289 159/901 |
| 4,014,735 A * | 3/1977 | Guth | | B01D 1/10 159/17.2 |
| 4,168,211 A * | 9/1979 | Pottharst, Jr. | | B01D 1/10 203/40 |
| 4,260,461 A * | 4/1981 | Pottharst, Jr. | | B01D 1/10 202/180 |
| 4,444,675 A * | 4/1984 | Goeldner | | C02F 5/025 210/698 |
| 4,986,975 A | 1/1991 | Schmidhammer et al. | | |
| 5,480,512 A * | 1/1996 | Sannholm | | B01D 1/26 162/16 |
| 7,413,634 B1 * | 8/2008 | Napier | | C02F 1/18 202/205 |
| 8,206,558 B2 * | 6/2012 | Fickenscher | | B01D 1/2818 202/202 |
| 8,603,301 B2 * | 12/2013 | Heins | | B01D 5/006 203/40 |
| 2009/0050467 A1 * | 2/2009 | Fickenscher | | C02F 1/048 202/185.1 |

FOREIGN PATENT DOCUMENTS

| | | |
|---|---|---|
| CN | 209438060 U | 9/2019 |
| CN | 210065174 U | 2/2020 |
| CN | 210251258 U | 4/2020 |
| DE | 884797 C | 7/1953 |
| DE | 972412 C | 7/1959 |
| DE | 19920695 A1 | 11/2000 |
| EP | 0022181 B1 | 10/1983 |
| EP | 0425000 A1 | 5/1991 |
| JP | 1-245802 A | 10/1989 |
| JP | 11-197497 A | 7/1999 |
| JP | 2002030475 A | 1/2002 |
| JP | 2013202588 A | 10/2013 |

* cited by examiner

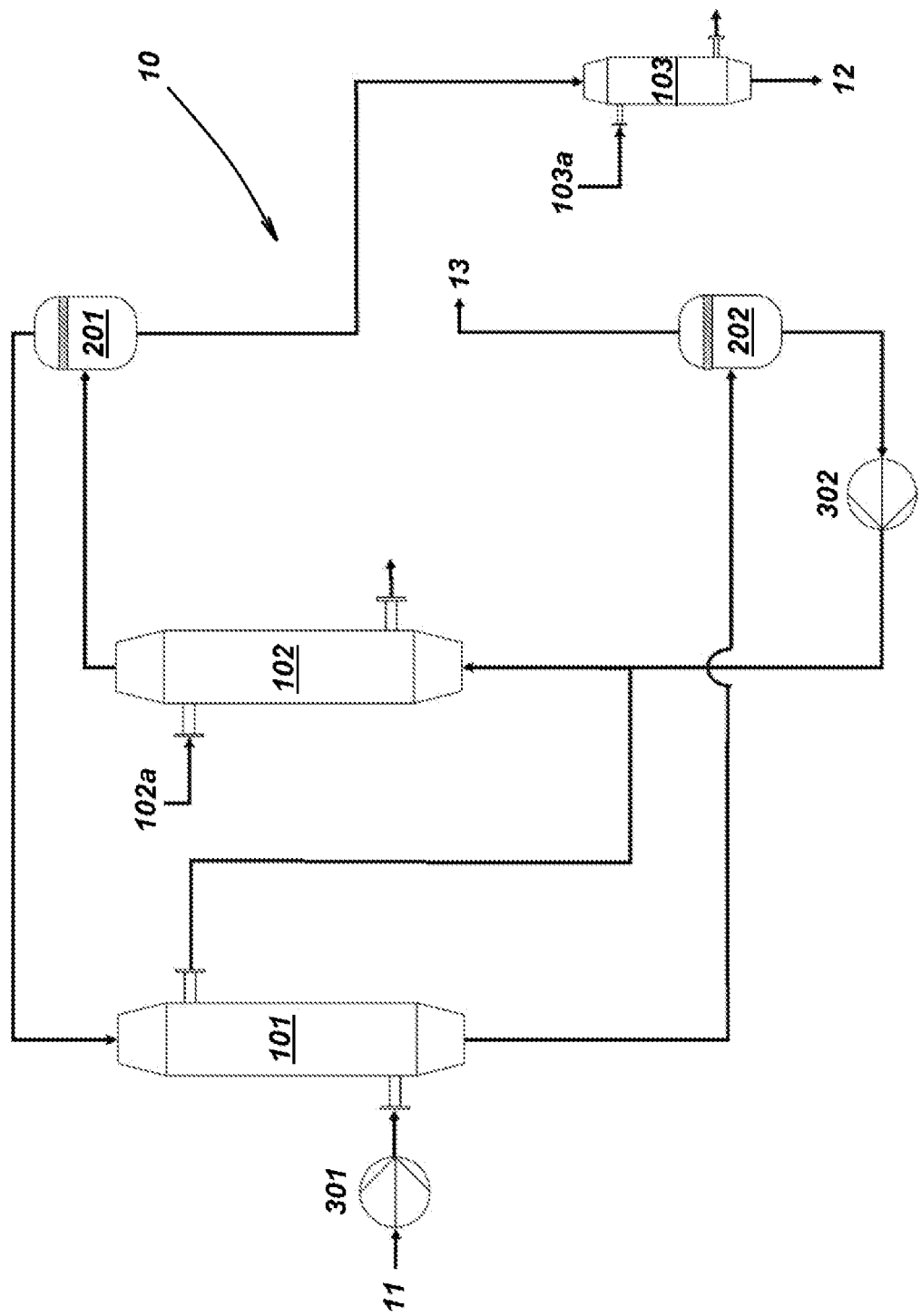

APPARATUS AND METHOD FOR CONCENTRATING CORROSIVE LIQUIDS

This application is a National Stage Application of PCT/EP2021/080641, filed Nov. 4, 2021, which in turn claims priority to German Patent Application No. 10 2020 131 827.8 filed Dec. 1, 2020.

The invention relates to an apparatus and a method for concentrating corrosive liquids such as, in particular, acids.

In the prior art, the concentration of corrosive liquids, such as dilute acids, is typically carried out in a multi-stage process, in which water is gradually removed from the acid at relatively low temperatures under vacuum. The vacuum is required to lower the boiling point of the acid sufficiently for water to evaporate at the given temperatures. A process of the generic kind for concentrating sulphuric acid is disclosed in EP 0 425 000 A1.

These methods are relatively energy-intensive, since only a small proportion of the waste heat from the individual process stages can be used beneficially in the process. In addition, due to the relatively low temperatures, organic impurities are not completely decomposed and still have to be separated separately. The maximum achievable acid concentrations are limited and the apparatuses have considerable space requirements. The control of process parameters is difficult in multi-stage processes.

The invention aims to provide an apparatus and a method for the concentration of corrosive liquids, which overcomes these limitations.

Against this background, the invention relates to an apparatus for the continuous concentration of corrosive liquids, the apparatus comprising a fluid system with an inlet for a dilute corrosive liquid, the fluid system comprising, downstream of the inlet and in serial arrangement, a regenerative heat exchanger for preheating the dilute liquid, a main heat exchanger or heating element for further heating the preheated liquid, and a main separator for separating solvent vapour from the heated liquid.

According to the invention, the fluid system further comprises a vapour line to supply solvent vapour, which has been separated from the heated liquid in the main separator, to the hot side of the regenerative heat exchanger as a heat source.

The corrosive liquids contain a corrosive substance in a solvent. After heating the corrosive liquid in the main heat exchanger or heating element, part of the solvent forms a gas phase with only a small residual content of the corrosive substance, while the remaining liquid phase comprises a high concentration of the corrosive substance. The solvent vapour is separated in the main separator before it is made available to the regenerative heat exchanger as a heat source. The possibility of using waste heat from the process to preheat the feed in the regenerative heat exchanger allows for a very energy-efficient processing.

Preferably, a product line connects the main separator to an outlet of the fluid system, which is intended for receiving concentrated liquid isolated in the main separator. The product line may comprise a cooling heat exchanger for cooling the product.

In addition to the inlet, the fluid system typically also has an outlet for concentrated corrosive liquid and another outlet for solvent removed from the liquid.

In particular, the fluid system may further comprise an auxiliary separator, connected downstream to the hot side of the regenerative heat exchanger, and configured for the separation of condensed liquid from cooled solvent vapour. More or less the entire amount of the corrosive substance contained in the solvent vapour remains in this condensed liquid, while only traces of the corrosive substance are left in the cooled solvent vapour.

Preferably, a solvent outlet line connects the auxiliary separator to an outlet of the fluid system, which is intended for solvent removed from the liquid.

It is further preferred that the fluid system further comprises a reflux line to supply condensed liquid, which has been separated from the cooled solvent vapour in the auxiliary separator, to the preheated liquid before entering the main heat exchanger or heating element. At an optimal tuning of process parameters, the temperature and the corrosive substance concentration in these two liquids to be mixed can be similar.

In a further preferred embodiment of the invention, some or all of the media-contacting parts of at least the main heat exchanger or heating element and the main separator are made of silicon carbide or are coated with silicon carbide where media-contacting. Silicon carbide can withstand highly corrosive media, such as concentrated acids, even at high temperatures of about 450° C.

The invention further relates to a method for continuously concentrating corrosive liquids, wherein in a first step a) a dilute corrosive liquid is continuously supplied to a fluid system (10); in a second step b) said liquid is then heated to a temperature sufficient to produce a liquid-vapour mixture at a given system pressure within said fluid system (10); and in a third step c) the solvent vapour is separated from said liquid-vapour mixture.

According to the invention, the system pressure is greater than 1 bar and preferably greater than 2 bar. The system pressures applied, according to the invention, are generally above 1 bar, which increases the boiling point of the corrosive liquids and enables for beneficial effects as mentioned.

Preferred pressure ranges can be between >1 and 25 bar, between 2 and 20 bar, between 3 and 10 bar, and in particular between 4 and 7 bar, depending on the specific application. Preferably, the system pressure is relatively constant in the entire fluid system between the inlet 11 and the outlets 12 or 13 and varies within the fluid system 10 by less than 2 bar, preferably less than 1 bar and further preferably less than 0.5 bar.

The temperature of the heated liquid and/or the corresponding liquid-vapour mixture is preferably greater than 200° C. Preferred ranges include a temperature range of from 220° C. to 450° C. and, in particular, a temperature range of between 250° C. and 300° C.

In particular, in the method of the invention the heating of the liquid in step b) can be effected, at least in part, by heat exchange with the solvent vapour separated from the liquid-vapour mixture in step c). For example, the liquid can such be preheated to a temperature in a range of from 110° C. to 220° C. and in particular in a range of from 140° C. to 190° C.

Further preferably, in one embodiment of the method, at least a portion of the liquid, condensed from the solvent vapour by cooling through heat exchange, is admixed to the liquid supplied in step a) prior to or during heating in step b).

The method can be carried out in an apparatus according to the invention. In this configuration, the diluted corrosive liquid can be preheated at the regenerative heat exchanger, in step b), by absorbing heat from the solvent vapour separated from the liquid-vapour mixture in step c), and further heated to the target temperature at the main heat exchanger or heating element. Separation according to step c) can be carried out at the main separator. Separation of condensed liquid from the solvent vapour, after being cooled by heat exchange at the regenerative heat exchanger, can be carried out at the auxiliary separator.

The apparatus and method according to the invention are suitable for concentrating acids such as sulphuric acid ($H_2SO_4$), nitric acid ($HNO_3$), hydrochloric acid (HCl) or hydrofluoric acid (HF), or also for concentrating bases, for example sodium hydroxide (NaOH) or potassium hydroxide (KOH), or for concentrating other corrosive liquids, for example oxidative liquids.

Due to the high temperatures and pressures, a very significant increase in concentration to a concentration, where the water content is only slightly greater than the water content of an azeotropic mixture, can be achieved in a single step. For example, the difference in water content to an azeotropic mixture may be less than 10%, less than 5%, or even less than 2%. In the case of sulphuric acid, whose azeotropic mixture contains about 98% of sulphuric acid, the concentration increase from a low concentration of less than 30% or less than 20% to more than 80%, more than 90% or even more than 95%, can, in a method of the invention, be achieved in a single step.

Further details and advantages of the invention will become apparent from the exemplary embodiment described below with reference to the FIGURE.

The FIGURE depicts a schematic illustration of an exemplary embodiment of an apparatus according to the invention, for concentrating a corrosive liquid comprising a corrosive substance in preferably aqueous solution.

The apparatus includes a fluid system 10 having an inlet 11 for dilute corrosive liquid, an outlet 12 for concentrated corrosive liquid, and another outlet 13 for solvent vapour.

The dilute corrosive liquid is fed to the fluid system 10 at inlet 11 by a feed pump 301, whose media-contacting parts are made from a corrosion resistant high performance alloy such as a Hastelloy® or Inconel® series alloy. The temperature of the dilute corrosive liquid fed to the fluid system 10 may be approximately ambient temperature, or within a common temperature range of between 10° C. and 50° C.

The pressure in the fluid system 10 is generally greater than 1 bar and may be, for example, between 4 and 7 bar. The pressure is kept within a certain corridor throughout the fluid system. Ideally, the pressure drop between inlet 11 and outlets 12 or 13 is less than 1 bar.

After entering the fluid system 10, the liquid first passes through a regenerative heat exchanger 101, where it is preheated by heat exchange with hot solvent vapour, the origin of which is discussed in more detail below. The temperature of the now heated dilute corrosive liquid at the outlet of the regenerative heat exchanger 101 may be in the range of 140° C. to 190° C., for example. Still, due to the increased system pressure, there is no significant evaporation of solvent.

The preheated diluted liquid 12 then passes through a main heat exchanger 102, where it is heated by heat exchange with a suitable medium 102a, such as hot oil, to a higher temperature of, for example, greater than 220° C., in some applications of between 250° C. and 300° C., in other applications to where solvent of the corrosive liquid evaporates despite the increased system pressure. The evaporation allows the hot media stream to be separated into a concentrated corrosive liquid stream and a solvent vapour stream, containing only minor amounts of the corrosive substance, in a main separator 201 located downstream of the main heat exchanger 102.

The concentrated corrosive liquid exiting the main separator 201 is then cooled in a cooling heat exchanger 103, by heat exchange with cooling water 103a, to a desired product temperature of, for example, less than 80° C. or less than 50° C., before exiting the fluid system 10 through the concentrated corrosive liquid outlet 12.

Hot solvent vapour, which was separated in the main separator 201 and still contains a certain amount of the corrosive substance, is fed to the hot side of the regenerative heat exchanger 101, where it is cooled, through a transfer of heat to the dilute corrosive liquid, to a temperature in the range from 110° C. to 220° C., in particular from 140° C. to 190° C., for example. A partial condensation of the solvent vapour, which occurs through cooling at approximately constant pressure, enables this media stream to be separated into a liquid stream and a vapour stream in an auxiliary separator 202, downstream of the hot side of the regenerative heat exchanger 101.

The liquid stream separated at the auxiliary separator 202 is admixed, with the help of a return pump 302, to the stream of fresh heated corrosive liquid, at a position between the cold side of the regenerative heat exchanger 101 and the main heat exchanger 102. At an optimal tuning of process parameters, the temperature and the corrosive substance concentration in these two liquids to be mixed can be similar.

The solvent vapour separated in the auxiliary separator 202 contains only trace amounts of the corrosive substance and exits the fluid system 10 through the solvent vapour outlet 13.

In a specific example, a 30% aqueous sulphuric acid ($H_2SO_4$) can be supplied to the system at inlet 11 at a flow rate of 10,000 kg/hr. The temperature of this acid can be 30° C. and the system inlet pressure can be set to 5.3 bar. In the regenerative heat exchanger 101, the temperature is raised to 165° C., while the pressure remains nearly constant (5.25 bar). At 165° C. and 5.25 bar, the 30% sulphuric acid remains liquid. In the main heat exchanger 102, the sulphuric acid, now with a flow rate of about 11,500 kg/hr as increased by the addition of liquid reflux from the auxiliary separator 202, is heated to a temperature of 290° C. The pressure, again, remains almost constant (5.1 bar). At 290° C. and 5.10 bar, water evaporates from the sulphuric acid and the media stream is separated at the main separator 201 into a liquid stream of hot 85% sulphuric acid (about 3,500 kg/hr) and a vapour stream of hot 4% sulphuric acid (about 8,000 kg/hr). The liquid stream of 85% sulphuric acid is cooled to about 50° C. in the cooling heat exchanger 103 and exits the fluid system 10 through the outlet 12. The hot vapour of 4% sulphuric acid is fed to the hot side of the regenerative heat exchanger 101, where it cools to about 160° C. by transferring heat to freshly fed dilute sulphuric acid. This cooling, at still nearly constant pressure of about 5 bar, leads to partial condensation of the vapour, enabling separation in the auxiliary separator 202 into a liquid stream of about 160° C. sulphuric acid of about 30% (about 1,500 kg/hr) and a vapour stream of about 160° C. water vapour (about 6,500 kg/hr), containing only traces of sulphuric acid. The vapour exits the fluid system 10 through outlet 13, and the liquid stream is admixed, as a return stream, to fresh acid upstream of the main heat exchanger 102.

In this example, the energy required to heat the corrosive fluid in the main heat exchanger 102, through the hot oil 102a, is about 4650 kW. About 450 kW are further used on cooling. Of these 5100 kW used, about 3950 kW or about 80% can regenerated due to the process setup.

In addition to concentrating sulphuric acid ($H_2SO_4$), the described apparatus and method can also suitably be used for concentrating other acids, for example nitric acid ($HNO_3$), hydrochloric acid (HCl) or hydrofluoric acid (HF), or for concentrating bases, for example sodium hydroxide (NaOH) or potassium hydroxide (KOH), or for concentrating other corrosive liquids, for example oxidative liquids.

The media-contacting parts of at least the main heat exchanger 102 and the main separator 201 are preferably made of silicon carbide (SiC), since this material can withstand highly corrosive media, such as concentrated acids, even at high temperatures of, for example, greater than 220° C. For the media-contacting parts of the additional separator 202, the requirements for high temperature chemical resistance are lower. Here, coating with inert polymers, such as PFA or PTFE, can be preferred.

Due to the high temperatures, organic impurities in the corrosive media are decomposed, such that both, the concentrated product (output 12) and the solvent free of the corrosive substance (output 13), are free of such impurities. The use of waste heat from the process to preheat the diluted corrosive medium in the regenerative heat exchanger 101 renders the method very energy efficient. The method is a continuous method, in which dilute corrosive liquid is continuously fed to the fluid system 10 at inlet 11, and concentrated corrosive liquid and solvent are continuously withdrawn at outlets 12 and 13.

The invention claimed is:

1. An apparatus for a continuous concentration of corrosive liquids, the apparatus comprising a fluid system with an inlet for a dilute corrosive liquid, the fluid system comprising, downstream of the inlet and in serial arrangement, a regenerative heat exchanger for preheating the dilute corrosive liquid, a main heat exchanger or heating element for further heating preheated dilute corrosive liquid, and a main separator for separating solvent vapour from heated dilute corrosive liquid from the main heat exchanger or heating element, wherein
the fluid system further comprises
  a vapour line to supply solvent vapour, which has been separated from the heated dilute corrosive liquid in the main separator, to a hot side of the regenerative heat exchanger as a heat source,
  an auxiliary separator connected downstream to the hot side of the regenerative heat exchanger, such that the auxiliary separator receives condensed liquid and cooled solvent vapour from the regenerative heat exchanger, the auxiliary separator configured for separation of the condensed liquid from the cooled solvent vapour, and
  a reflux line to supply condensed liquid, which has been separated from the cooled solvent vapour in the auxiliary separator, to the dilute corrosive liquid.

2. The apparatus according to claim 1, wherein the reflux line is configured to supply the condensed liquid to the preheated dilute corrosive liquid before entering the main heat exchanger or heating element.

3. The apparatus according to claim 1, wherein some or all of media-contacting parts of at least the main heat exchanger or heating element and the main separator are made of silicon carbide or are coated with silicon carbide where media-contacting.

4. A method for continuously concentrating corrosive liquids, wherein said method utilizes the apparatus of claim 1, and wherein
  a) a dilute corrosive liquid is continuously supplied to the fluid system;
  b) said liquid is then heated to a temperature sufficient to produce a liquid-vapour mixture at a given system pressure within said fluid system; and
  c) a solvent vapour is separated from said liquid-vapour mixture;
wherein
the system pressure is greater than 1 bar.

5. The method according to claim 4, wherein the system pressure is between 2 and 20 bar.

6. The method according to claim 4 wherein the temperature, to which the liquid is heated in step b), is greater than 200° C.

7. The method according to claim 4 wherein the heating of the liquid in step b) is effected, at least in part, by heat exchange with the solvent vapour separated from the liquid-vapour mixture in step c).

8. The method according to claim 7, wherein at least a portion of a liquid condensed from the solvent vapour by cooling through heat exchange is admixed to the liquid supplied in step a) prior to or during heating in step b).

9. The method according to claim 4, wherein the corrosive liquid is an aqueous acid.

10. The method according to claim 4, wherein the system pressure is greater than 2 bar.

11. The method according to claim 4, wherein the system pressure is between 3 and 10 bar.

12. The method according to claim 4, wherein the system pressure is between 4 and 7 bar.

13. The method according to claim 4 wherein the temperature, to which the liquid is heated in step b), is in a range of 220° C. to 450° C.

14. The method according to claim 4 wherein the temperature, to which the liquid is heated in step b), is in a range of 250° C. to 300° C.

15. The method according to claim 4, wherein the corrosive liquid aqueous sulphuric acid.

* * * * *